United States Patent
Micke et al.

(10) Patent No.: US 7,265,538 B2
(45) Date of Patent: Sep. 4, 2007

(54) METHOD AND DEVICE FOR MEASURING THE ROTATIONAL SPEED OF A PULSE-ACTIVATED ELECTRIC MOTOR BASED ON A FREQUENCY OF CURRENT RIPPLES

(75) Inventors: Marc Micke, Kornwestheim (DE); Holger Sievert, Ludwigsburg (DE); Juergen Hachtel, Moeckmuehl (DE); Guenther Hertlein, Fichtenberg (DE)

(73) Assignee: Robert Bosch GmbH, Stuttgart (DE)

( * ) Notice: Subject to any disclaimer, the term of this patent is extended or adjusted under 35 U.S.C. 154(b) by 257 days.

(21) Appl. No.: 10/660,910

(22) Filed: Sep. 12, 2003

(65) Prior Publication Data

US 2004/0124831 A1   Jul. 1, 2004

(30) Foreign Application Priority Data

Sep. 12, 2002   (DE) .............................. 102 42 334

(51) Int. Cl.
  *G01P 3/46*   (2006.01)
(52) U.S. Cl. ...................... 324/177; 324/163; 324/166; 318/254
(58) Field of Classification Search .............. 324/177, 324/160, 166, 173, 174, 170, 76.69; 318/565, 318/490
  See application file for complete search history.

(56) References Cited

U.S. PATENT DOCUMENTS

| | | | | |
|---|---|---|---|---|
| 3,870,935 A | * | 3/1975 | Abels et al. .................. | 318/52 |
| 4,514,670 A | * | 4/1985 | Fassel et al. ................. | 318/467 |
| 4,673,848 A | * | 6/1987 | Hagiwara et al. ........... | 318/266 |
| 4,730,152 A | * | 3/1988 | Foust et al. .................. | 318/603 |
| 4,744,041 A | * | 5/1988 | Strunk et al. ................. | 702/84 |
| 5,432,421 A | * | 7/1995 | Kessler et al. .............. | 318/538 |
| 5,483,132 A | * | 1/1996 | Arata et al. .................. | 318/282 |
| 5,564,047 A | * | 10/1996 | Bloem et al. ............... | 707/100 |
| 5,664,047 A | | 9/1997 | Hanson | |
| 5,898,288 A | * | 4/1999 | Rice et al. ................... | 318/685 |
| 6,144,179 A | * | 11/2000 | Kessler et al. .............. | 318/565 |
| 6,236,175 B1 | * | 5/2001 | Mourad et al. ............. | 318/268 |
| 7,196,486 B2 | * | 3/2007 | Nakamura et al. .......... | 318/469 |

FOREIGN PATENT DOCUMENTS

| | | |
|---|---|---|
| DE | 32 26 614 | 1/1984 |
| DE | 196 02 362 | 7/1997 |
| DE | 196 48 402 | 5/1998 |
| FR | 2 783 983 | 3/2000 |

* cited by examiner

*Primary Examiner*—Jay M. Patidar
(74) *Attorney, Agent, or Firm*—Kenyon & Kenyon LLP

(57) ABSTRACT

A method and a device for measuring the speed of a pulse-activated electric motor are described. According to this method, the motor is fully activated at time intervals to be determined for a defined measuring time by the circuit element provided for timing and, in this time, the frequency of the current ripples, which is proportional to the motor speed, is measured. A current-proportional voltage measuring device is located on the circuit element, on whose load side are located an amplifier, filters, and an evaluation circuit in the form of a comparator for determining the frequency of the current ripples flowing in a measured phase during which the motor is fully activated.

8 Claims, 4 Drawing Sheets

METHOD AND DEVICE FOR MEASURING THE ROTATIONAL SPEED OF A PULSE-ACTIVATED ELECTRIC MOTOR BASED ON A FREQUENCY OF CURRENT RIPPLES

FIELD OF THE INVENTION

The present invention relates to a method and a device for measuring the rotational speed of an electric motor activated in a pulsed fashion.

BACKGROUND INFORMATION

In order to determine the rotational speed of an electric motor for the purpose of speed regulation, magnetic or optical transmitters are known that are attached to the shaft of the motor and that are read by magnetic and/or optical sensors on the stator housing. However, such devices tend to have a high cost.

For electric motors that are operated using pulse width modulation (PWM) voltage supply, i.e., in a pulsed fashion, a simpler and more cost-effective method is known to measure the voltage produced by the generator in the non-activated phases, the level of said voltage being proportional to the rotational speed of the motor.

However, the level of the voltage is not a very precise measure of the speed, so this method is not suitable for precise regulation.

German Published Patent Application No. 32 26 614 describes the detection of the ripple content of the current for a circuit arrangement for extending and retracting an automobile antenna in a motorized fashion. If the frequency of the ripple content decreases considerably and finally becomes zero, this event signals that the speed of the motor has approached zero, i.e., the antenna has reached a stop. Here, the speed of the driving motor is not regulated, but rather merely rough information is gathered as to whether the driving motor is rotating or standing still. In addition, this solution is not suitable for motors activated in a pulsed fashion.

A method is known from U.S. Pat. No. 5,664,047 in which the ripple content of the current (current ripple) of a PWM-regulated electric motor is to be used to determine the rotational speed. However, the measurement is made more difficult by the constant change between the activated and non-activated phases of the motor. The shorter the current pulses, which depends on the selected pulse frequency, the target speed, and the load on the motor, the less certain the measuring signal becomes, which can result in erroneous control and thus to fluctuations in the speed.

SUMMARY OF THE INVENTION

In contrast, the method according to the present invention and the device according to the present invention offer the advantage that it is possible for the speed of an electric motor activated in a pulsed fashion to be detected simply and cost-effectively, but also precisely.

According to the present invention, the motor is fully activated at time intervals to be determined by the circuit element provided for pulsing purposes and, in this time period, the frequency of the current ripple (current ripple=amplitude of the AC component of the current) proportional to the motor speed is measured.

In motors to which only a low level of load torque is applied, there is hardly any change in speed. The method has the advantage that, after the time interval to be determined, it is always possible to analyze enough current ripples during the measuring time to detect the speed. From the number of current ripples during the measuring phase, it is possible to use an electronic switch to generate square-wave voltages that correspond to the commutation at the motor collector. The time interval between the edges of this square-wave signal is a measure of motor speed. If a heavy load is applied to the commutator, it may also be practical to use the distances between the time midpoints of the rising and falling edges for measurement instead.

The time interval and the measuring time need not be constant. They may be variable as a function of the supply voltage, the temperature, and/or the load torque.

A corresponding device provides a motor having a circuit element, for example, a transistor, connected on the line side, a control circuit for the circuit element, a voltage tap over the circuit element, an amplifier connected on the load side, a filter, and an evaluation circuit. The time interval and measuring time are stored in the control circuit. After the time interval has expired, the drive circuit of the motor is fully activated and the evaluation circuit also receives a start pulse. This start pulse is not absolutely necessary, but it does shorten the required measuring time. The DC component in the measured voltage is filtered out by the filter. In the evaluation circuit, the frequency of the AC component in the voltage of the motor during the currently running measuring time, which is proportional to the speed, is determined, for example, in that the filtered AC voltage is decomposed by a comparator into square-wave voltage pulses whose edge spacing (either rising or falling) or whose distances between time midpoints are measured. The evaluation may be performed in a microprocessor, for example.

DETAILED DESCRIPTION

Figure 1:
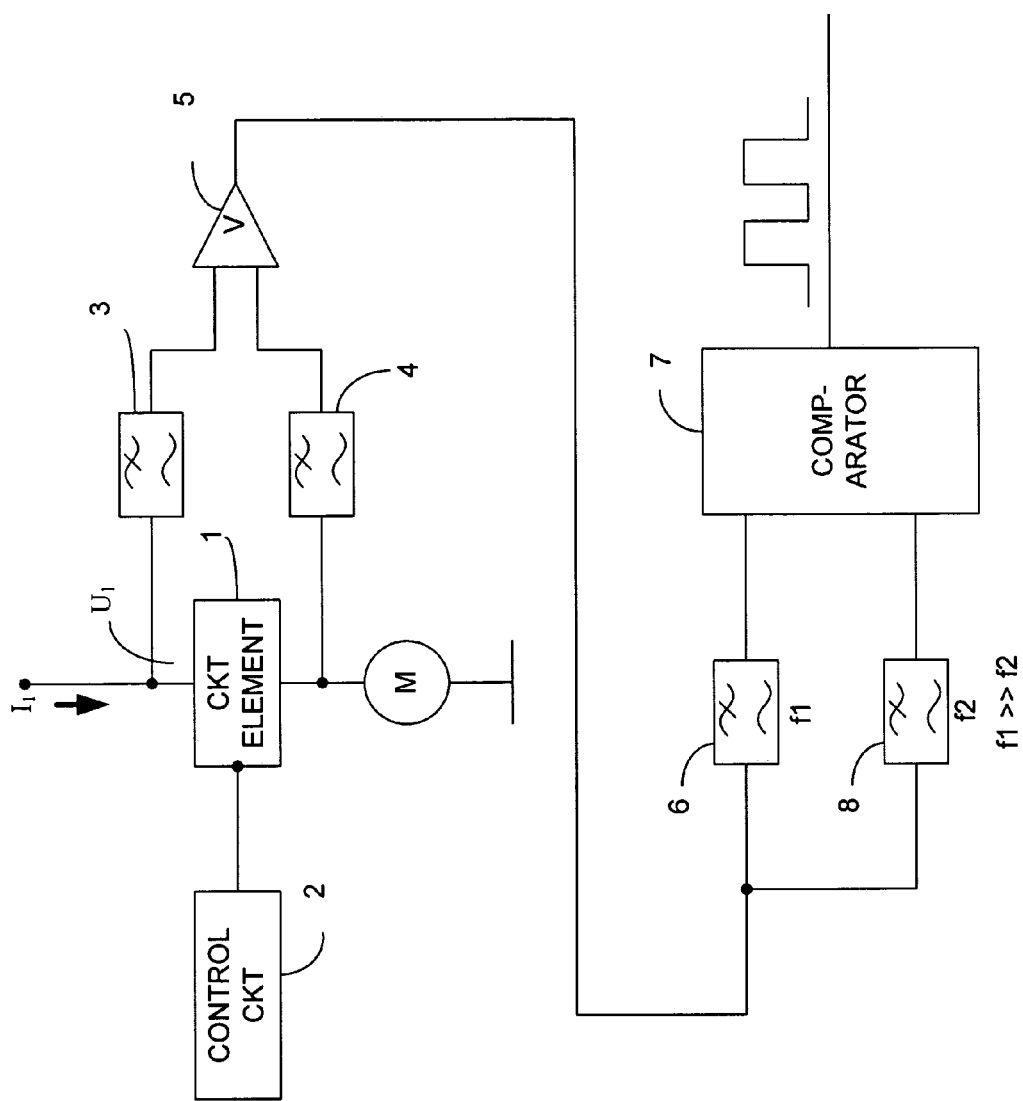
FIG. 1 shows a basic circuit of the device according to the present invention.

FIG. 1 shows a basic circuit diagram of the arrangement, for example, for a pump drive in a motor vehicle. A motor M is controlled by a control circuit 2 using PWM by way of a circuit element 1, for example, a transistor. A correspondingly lower speed n than in the case of constant activation of motor M is generated from the on/off switching ratio. Because of the vehicle wiring system, pulsing frequency $f_0$ must be at least 50 Hz, for example. During the activation phase, higher-frequency oscillations whose frequency is proportional to speed n of motor M are caused in motor current $I_{motor}$ (current ripple) by the commutation of the current at the collector of the motor. The duration of an individual current ripple depends on the number of the pole pairs and rotational speed n of motor M.

Figure 2:
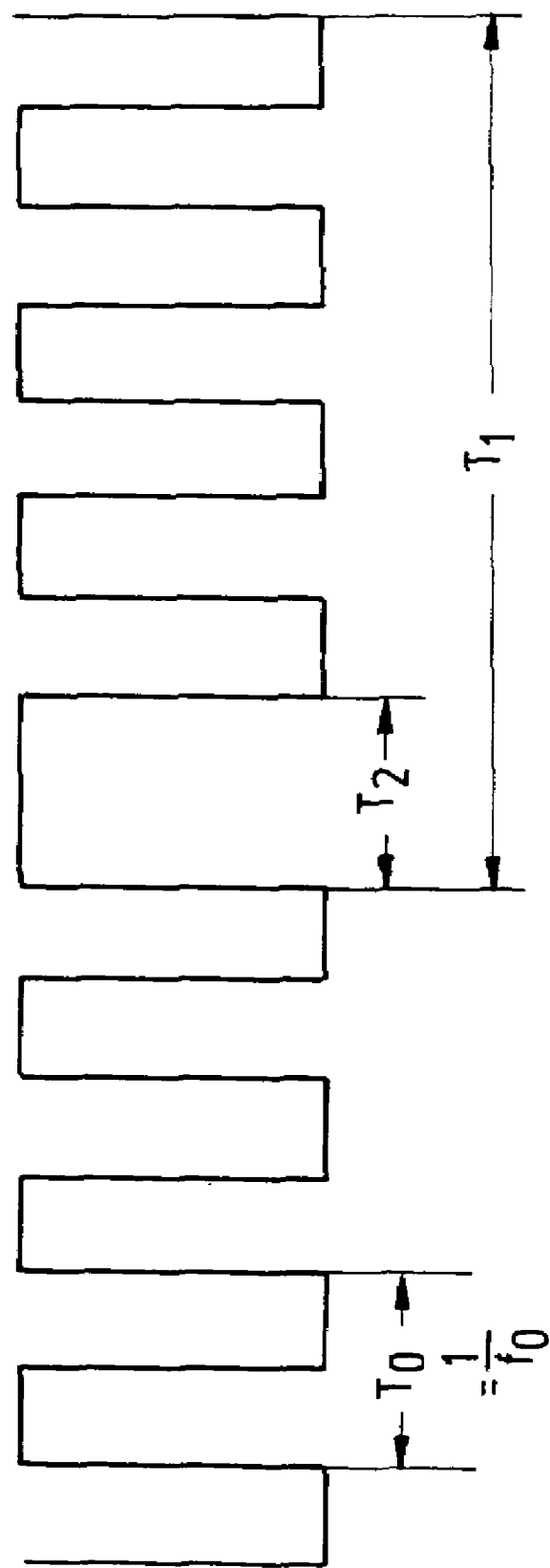
FIG. 2 shows the insertion of the measuring time into the control pulse of the motor.

According to the method of the present invention, motor M is fully activated for a certain time period, or measuring time $T_2$ (see FIG. 2) after the expiration of a time interval $T_1$, for example, 100 ms, using control circuit 2. Measuring time $T_2$ must be selected to be long enough so that speed n can be reliably detected from a plurality of current ripples, for example, 20 ms. This occurs after measured voltage U1 passes to circuit element 1 from low pass filters 3 and 4, amplification in an amplifier 5, and further filtering in a low pass filter 6 using a comparator 7. Here, speed n of motor M changes only insignificantly. The brief complete activation is barely detectable in the motor noise. The threshold value for comparator 7 is acquired from the useful signal after filtering in a low pass filter 8.

Figure 3:
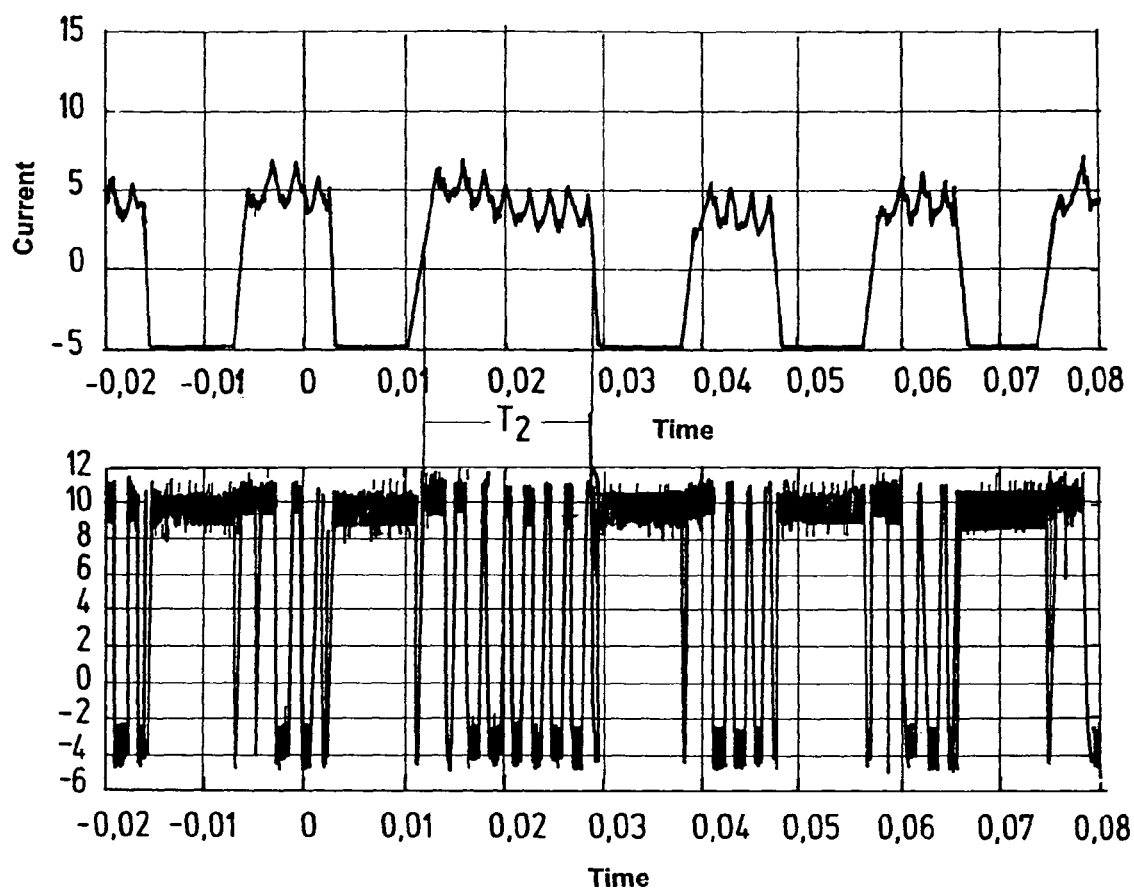
FIG. 3 shows the voltage at the circuit element.

FIG. 3 shows the signal of the current-proportional voltage U1 across circuit element 1. During measuring time $T_2$, the commutations are clearly represented as an AC signal. The filtered alternating current may be transformed into corresponding square-wave voltages U2. The time interval between the edges of the square-wave signal is then a measure for speed n of motor M.

Figure 4:
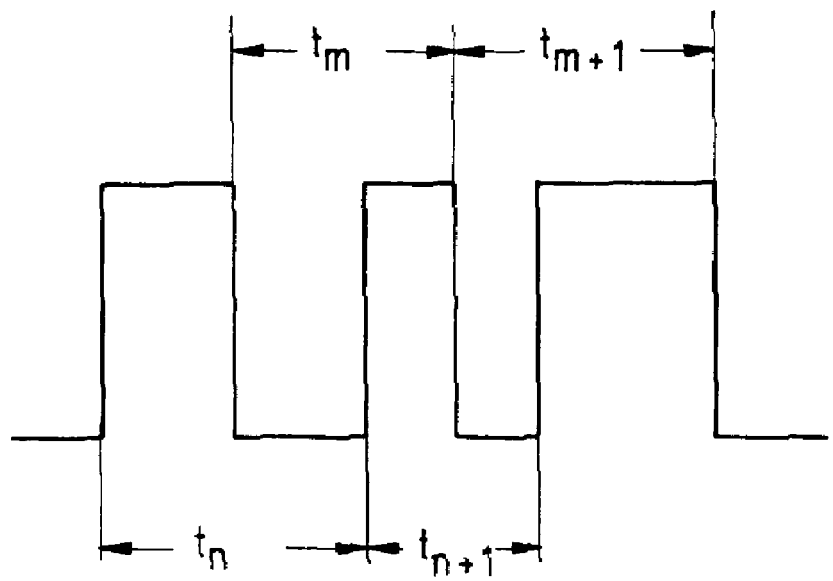
FIG. 4 shows a first view of the variants for evaluation of the measuring signal.
Figure 5:
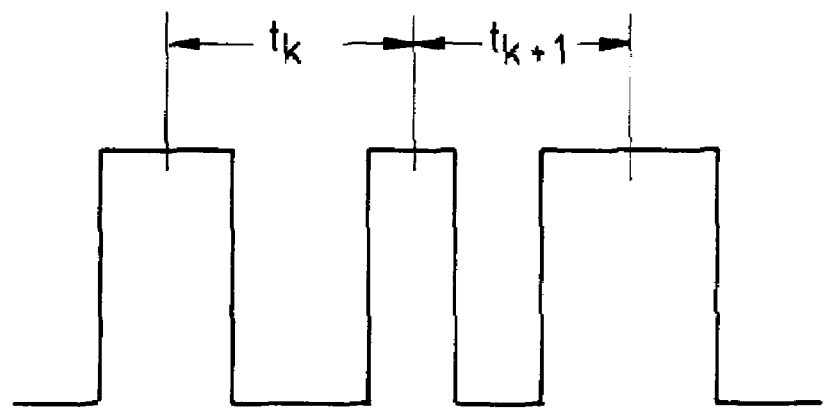
FIG. 5 shows a second view of the variants for evaluation of the measuring signal.

As is shown in FIG. 4, time intervals $t_n$ between the rising edges or time intervals $t_m$ between the falling edges of the square-wave signal may be used. However, intervals $t_k$ between the time midpoints of the rising and falling edges are also suitable for analysis, as is shown in FIG. 5.

The motor may be regulated in a more precise manner using a more precise detection of the actual speed, which has an immediate influence on the pump noise when the motor is used as a pump drive as described in the present example.

What is claimed is:

1. A method for measuring a rotational speed of a pulse activated electric motor, comprising:
    fully activating the pulse activated electric motor for a defined measuring time by a circuit element provided for pulsing at a time interval to be determined; and
    during the time interval, measuring a frequency of current ripples, the frequency being proportional to the rotational speed.

2. The method as recited in claim 1, further comprising:
    measuring a current proportional voltage; and
    converting the measured current proportional voltage to a square wave voltage after filtering out a DC component.

3. The method as recited in claim 2, further comprising:
    determining intervals between one of rising edges and falling edges of square wave voltage pulses in order to determine a frequency of the square wave voltage.

4. The method as recited in claim 2, further comprising:
    determining intervals between time midpoints of square wave voltage pulses in order to determine a frequency of the square wave voltage.

5. The method as recited in claim 1, wherein:
    at least one of time intervals and measuring times are kept variable as a function of at least one of a supply voltage, a temperature, and load torque.

6. A device for measuring a rotational speed of a pulse activated electric motor,
    comprising:
    a circuit element;
    a current proportional voltage measuring device connected to the circuit element;
    an amplifier connected to a side of the circuit element;
    a plurality of filters connected to the side of the circuit element; and
    an evaluation unit for determining a frequency of current ripples of a current flowing in a measured phase in which the pulse activated electric motor is fully activated.

7. The device as recited in claim 6, wherein:
    the evaluation unit includes a comparator for converting an AC component of a current proportional voltage into square wave voltage pulses.

8. A method for measuring a rotational speed of a pulse activated electric motor, comprising:
    fully activating the pulse activated motor for a defined measuring time; and
    during the defined measuring time and while the pulse activated electric motor is fully activated, measuring a frequency of current ripples, the frequency being proportional to the rotational speed.

* * * * *